US006259910B1

United States Patent
Fairfield et al.

(10) Patent No.: US 6,259,910 B1
(45) Date of Patent: Jul. 10, 2001

(54) WIRELESS TELECOMMUNICATIONS SYSTEM ARCHITECTURE SUPPORTING BLOCK RADIO TECHNOLOGY

(75) Inventors: Robert Charles Fairfield, Randolph; Carmine James Pagano, II, Blairstown; John Stanley Rucki, New Providence; Michael Ralph Simmons, Ft. Lee; Christopher F. Zappala, Whitehouse Station, all of NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/023,682

(22) Filed: Feb. 13, 1998

(51) Int. Cl.[7] .................................................. H04Q 7/20
(52) U.S. Cl. .......................................... 455/422; 455/502
(58) Field of Search ................................... 455/561, 502, 455/11.1, 524, 3.1, 523, 14, 422; 375/356; 379/56.1, 56.2, 56.3; 370/321, 337, 347, 442

(56) References Cited

U.S. PATENT DOCUMENTS

| | | | | |
|---|---|---|---|---|
| 3,898,566 | * | 8/1975 | Switzer et al. .......................... 455/4.1 |
| 5,187,803 | * | 2/1993 | Sohner et al. .......................... 455/4.1 |
| 5,276,918 | * | 1/1994 | Cornforth et al. ..................... 455/331 |
| 5,278,690 | * | 1/1994 | Vella-Coleiro .......................... 57/210 |
| 5,377,255 | * | 12/1994 | Beasley ................................. 370/279 |
| 5,381,459 | * | 1/1995 | Lappington ........................... 455/426 |
| 5,390,235 | * | 2/1995 | Beasley ................................. 455/465 |
| 5,408,514 | * | 4/1995 | Sakamoto et al. .................... 455/436 |
| 5,457,734 | * | 10/1995 | Eryaman et al. ..................... 455/422 |
| 5,481,570 | * | 1/1996 | Winters ................................. 375/347 |
| 5,598,287 | * | 1/1997 | Van Driel et al. .................... 359/125 |
| 5,678,177 | * | 10/1997 | Beasley ................................. 455/16 |
| 5,781,859 | * | 7/1998 | Beasley ................................. 455/423 |
| 5,799,252 | * | 8/1998 | Nakagoshi et al. ................... 455/524 |
| 5,802,173 | * | 9/1998 | Hamilton-Piercy et al. ........ 379/56.2 |
| 5,872,810 | * | 2/1999 | Philips et al. ......................... 375/222 |
| 5,924,022 | * | 7/1999 | Beasley et al. ....................... 455/218 |
| 5,926,547 | * | 7/1999 | Heieis et al. .......................... 380/210 |
| 5,995,593 | * | 11/1999 | Cho ...................................... 379/56.3 |
| 6,023,628 | * | 2/2000 | Beasley ................................. 455/561 |
| 6,032,057 | * | 2/2000 | Kiiski ................................... 455/562 |

* cited by examiner

Primary Examiner—Nay Maung
Assistant Examiner—Sonny Trinh
(74) Attorney, Agent, or Firm—DeMont & Breyer, LLC; Jason Paul DeMont; Wayne S. Breyer

(57) ABSTRACT

A wireless telecommunications system architecture is disclosed that is capable of supporting a centralized block radio architecture and of distributing the information-bearing signals from the block radio to geographically-dispersed radio heads using relatively low-cost cable (e.g., twisted-pair, etc.). In accordance with the illustrative embodiment of the present invention, a radio multiplexes, modulates, and channel codes one or more information-bearing signals and upconverts them, not to radio frequency, but to an intermediate frequency that can be transmitted over a low-cost cable. Co-located with each radio head is an upconverter that upconverts the intermediate frequency signal to radio frequency in preparation for radiation by an antenna.

32 Claims, 4 Drawing Sheets

100

WIRELESS TELECOMMUNICATIONS SYSTEM ARCHITECTURE SUPPORTING BLOCK RADIO TECHNOLOGY

FILED OF THE INVENTION

The present invention relates to telecomminications in general, and, more particularly, to an architecture for a wireless telecommunications system.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 via wireline 102-1. Upon receipt of the information, and with the knowledge that it is intended for wireless terminal 101-2, Wireless Switching Center 120 then returns the information back to base station 103-1, again via wireline 102-1, which relays the information, via radio, to wireless terminal 101-2.

FIG. 2 depicts a block diagram of the architecture of a typical wireless telecommunications system in the prior art. Typically, each base station is connected to base station controller 201 via a separate and distinct wireline. Base station controller 201 can be, but is not necessarily, co-located with Wireless Switching Center 120.

For example, base station 103-1 is connected to base station controller 201 via wireline 102-1 and base station 103-3 is connected to base station controller 201 via wireline 102-3. Wirelines 102-1 and 102-3 can be fabricated from inexpensive and easily installed twisted-pair. In accordance with this architecture, each radio is located near the antennas with which it transmits and receives. In contrast, the emergence of another technology suggests removing the radios from the base stations and centralizing their functionality in a single unit known as a block radio.

A block radio is a digital signal processor that is programmed to multiplex, modulate, channel code, and upconvert one or more information-bearing signals using digital signal processing techniques. A block radio performs the same functionality as one or more traditional radios, but has several characteristics that are different than traditional radios. First, a traditional radio processes a single information-bearing signal. In contrast, a block radio is generally capable of processing a plurality of information-bearing signals simultaneously.

Second, a traditional radio is fabricated from radio-frequency components (e.g., capacitors, inductors, oscillators, etc.) and the processing of the information-bearing signal is performed by, and is largely defined by, the electrical characteristics of the components. In contrast, a block radio principally comprises a digital signal processor and the processing of the information-bearing signals is defined by software and software parameters.

Third, a change in the characteristics of a information-bearing signal (e.g., modulation scheme, bandwidth, etc.) can be implemented in a traditional radio by changing one or more of the radio-frequency components. In contrast, a change in the characteristics of a information-bearing signal can be implemented in a block radio by changing software and/or software parameters controlling the block radio. This enables a block radio to be re-defined and upgraded remotely via a telecommunications link.

Fourth, a block radio is generally less expensive than multiple traditional radios of comparable quality and processing power.

And fifth, because a block radio processes a plurality of information-bearing signals, it is capable of performing inter-information-bearing signal processing (e.g., diversity combining, beamforming, adjacent channel interference reduction, etc.) that a traditional radio, which sees only one information-bearing signal, is incapable of performing. Therefore, a block radio is more flexible, more powerful, less expensive and more-easily upgraded than the traditional radios that is capable of replacing.

FIG. 3 depicts a block diagram of a typical wireless telecommunications architecture in the prior art that incorporates block radio technology and that comprises: wireless switching center 120, baseband unit 301, radio heads 303-1 and 303-2, and wirelines 304-1 and 304-2. In accordance with this architecture, each geographically-dispersed base station of FIG. 2 is replaced with a radio head and baseband unit 301, which comprises block radio 302, is interposed between wireless switching center 120 and radio heads 303-1 and 303-2. Furthermore, in accordance with this architecture, block radio 302 interfaces with base station controller 201 and provides the functionality provided by the distributed traditional radios in the architecture of FIG. 2. Each of radio heads 303-1 and 303-2 comprises an amplifier and associated antenna.

In addition to the advantages provided by block radio 302, this architecture is advantageous because of the simple, uniform, and inexpensive design of the radio heads that it affords. The architecture in FIG. 3 is disadvantageous over the predecessor architecture in FIG. 2 in that the information-bearing signals transmitted between baseband unit 301 and radio heads 303-1 and 303-2 are at RF frequencies, which requires that wirelines 304-1 and 304-2 be fabricated from expensive and difficult-to-install coaxial cables. Furthermore, the fact that the signals transmitted between baseband unit 301 and radio heads 303-1 and 303-2 are at radio frequency considerably restricts the distance that baseband unit 301 can be from radio heads 303-1 and 303-2.

Therefore, the need exists for a wireless telecommunications system architecture that exhibits the advantages of block radio technology without the expense, distance limitation, and implementation difficulty associated with wirelines that are capable of transmitting signals at RF frequencies.

SUMMARY OF THE INVENTION

The present invention is a wireless telecommunications system that has some of the advantages of block radio technology without some of the disadvantages associated with block radio architectures in the prior art. In particular, some embodiments of the present invention comprise a centralized baseband unit, with a block radio, that is connected to multiple, geographically-dispersed radio heads via low-cost, easily-installed wireline (e.g., twisted-pair, etc.). This is advantageous because it provides an architecture that is more powerful, more flexible, more easily-upgraded, and less-expensive than some architectures in the prior art.

In accordance with the illustrative embodiment of the present invention, a block radio multiplexes, modulates, and channel codes one or more information-bearing signals in accordance with the particular air-interface standard (e.g., GSM, IS-54 TDMA, IS-95 CDMA, etc.), in well-known fashion, and upconverts them, not to radio frequency, but to an intermediate frequency that can be transmitted over a low-cost wireline to a radio head. Each radio head then receives one or more intermediate-frequency signals and upconvert them to radio frequency in preparation for radiation by the antenna. This is advantageous because the additional cost of the upconverter in each radio head, which makes transmission to the radio heads over inexpensive wireline possible, is negligible in comparison to the savings gained by using low-cost wirelines.

Furthermore, some embodiments of the present invention allow signals to be distributed from a block radio to multiple antennas via a single wireline, which can create further cost savings in some circumstances.

And still furthermore, because the signals are transmitted from the baseband unit to the respective radio heads at intermediate frequencies, the baseband unit can be located considerably farther away from the radio heads than if the signals are transmitted at radio frequencies. This is advantageous because it provides additional flexibility in implementation.

An illustrative embodiment of the present invention comprises: means for upconverting a first information-bearing signal to a first intermediate frequency and a second information-bearing signal to a second intermediate frequency; means for transmitting the first information-bearing signal at the first intermediate frequency over a first wireline and for transmitting the second information-bearing signal at the first intermediate frequency over a second wireline; a first upconverter for receiving the first information signal at the first intermediate frequency from the first wireline and for upconverting the first information-bearing signal to a first radio frequency; and a second upconverter for receiving the second information signal at the first intermediate frequency from the second wireline and for upconverting the second information-bearing signal to a second radio frequency.

DETAILED DESCRIPTION

Figure 1:
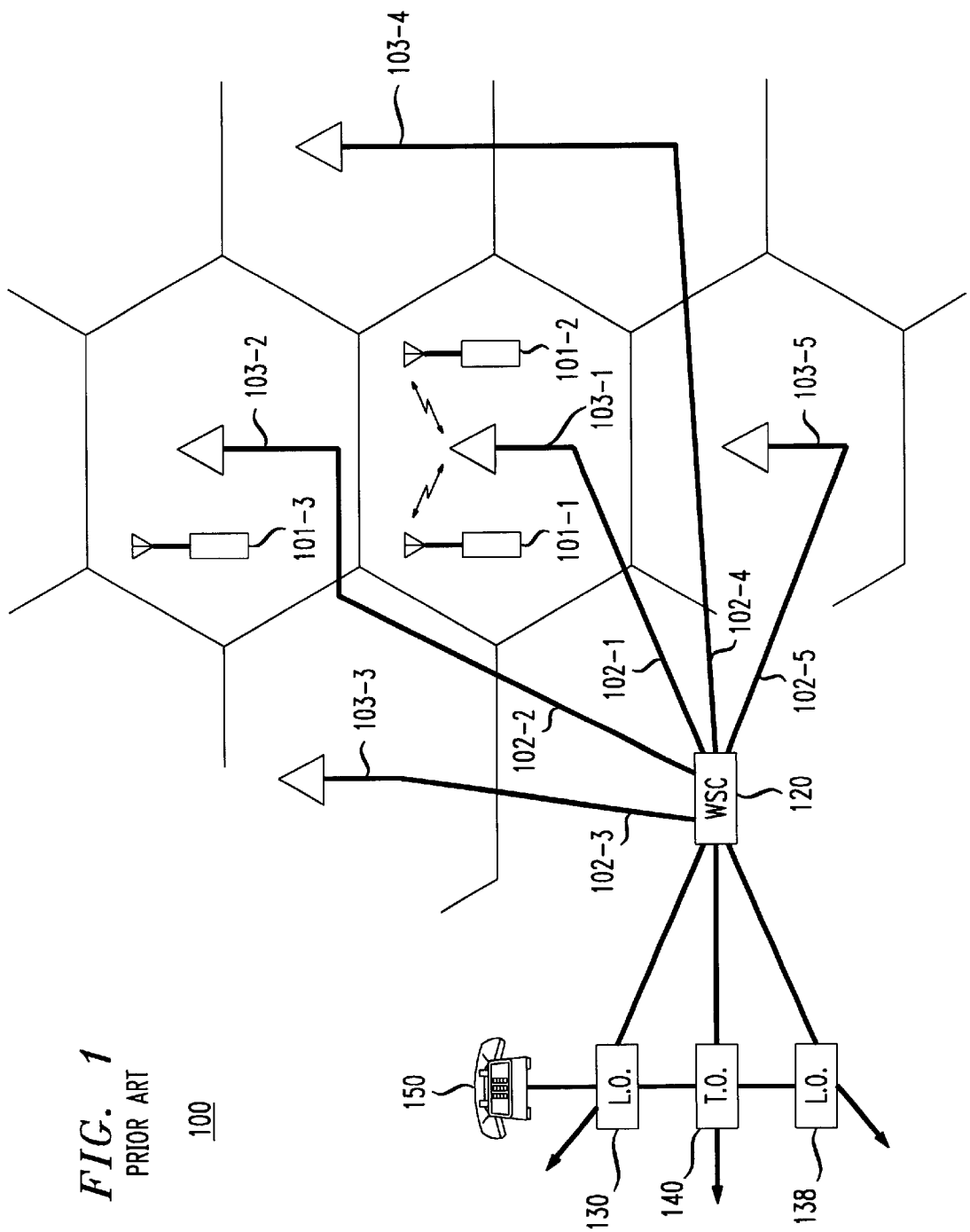
FIG. 1 depicts a schematic diagram of a wireless telecommunications system in the prior art.
Figure 2:
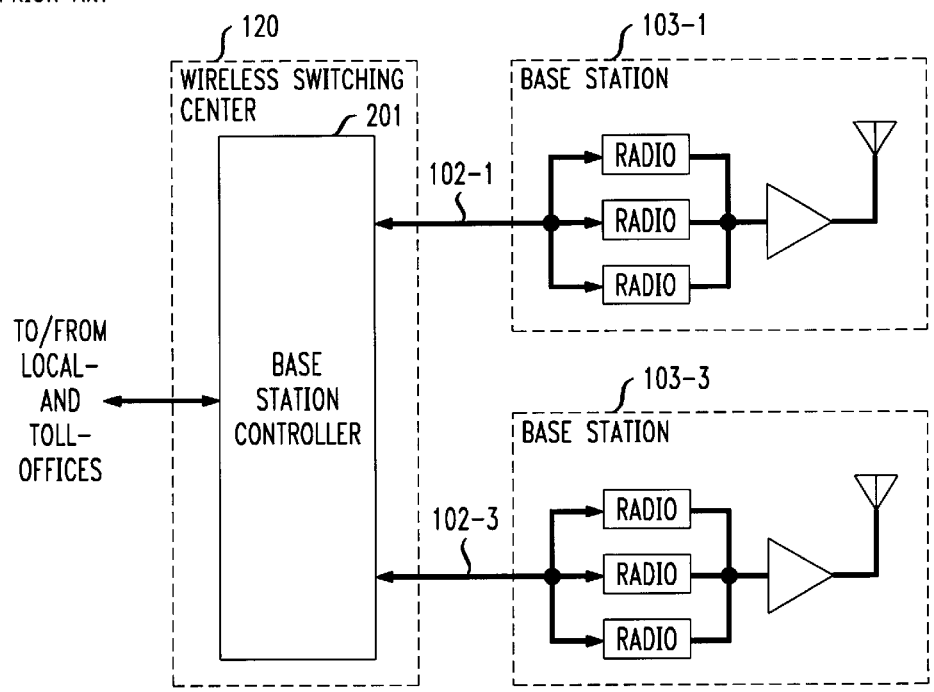
FIG. 2 depicts a block diagram of one wireless telecommunications system architecture in the prior art.
Figure 3:
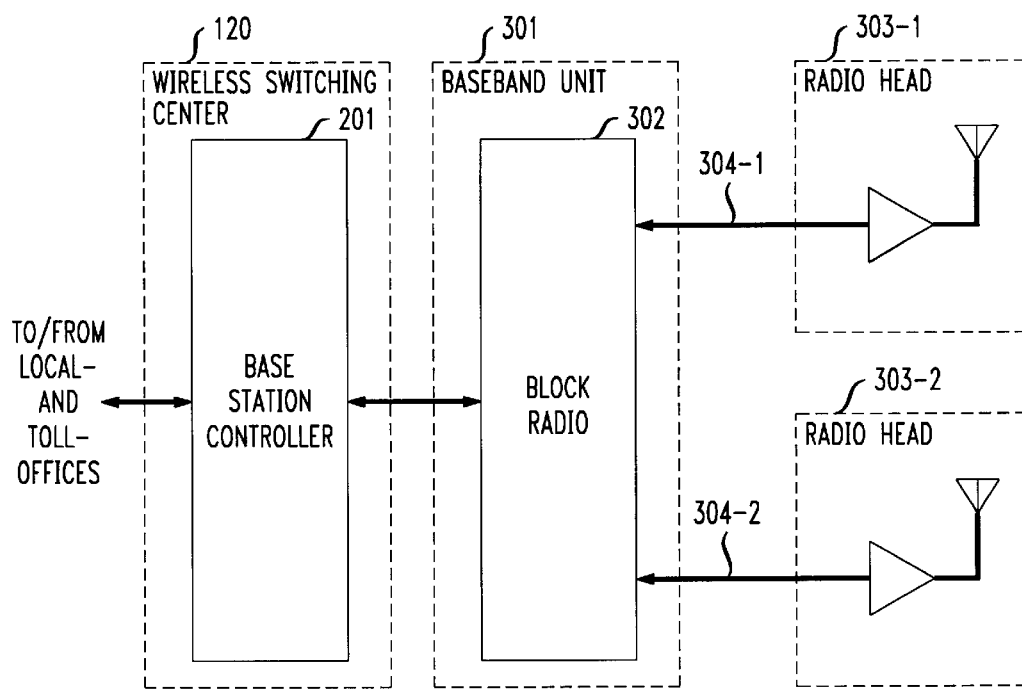
FIG. 3 depicts a block diagram of a second wireless telecommunications system architecture in the prior art that utilizes block radio technology.
Figure 4:
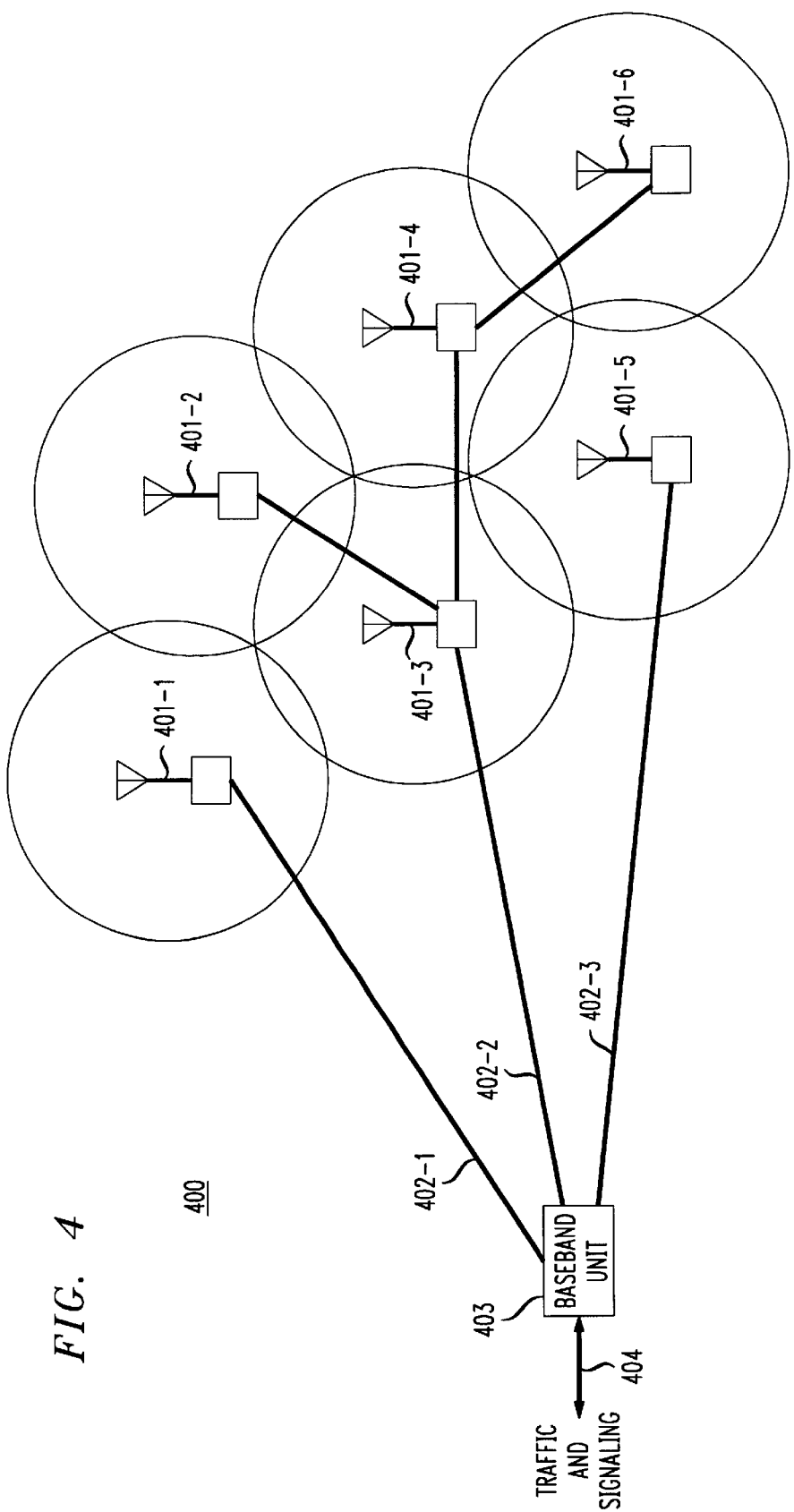
FIG. 4 depicts a schematic diagram of a wireless telecommunications system architecture in accordance with the illustrative embodiment of the present invention.

FIG. 4 depicts a schematic diagram of the architecture of wireless telecommunications system 400, which provides wireless telecommunications service to one or more wireless terminals (not shown). It will be clear to those skilled in the art that only those aspects of a wireless telecommunications system architecture concerning the "downlink" or "forward" channels are described in this disclosure. Those aspects of the architecture concerning the "uplink" or "reverse" channel are taught in commonly-assigned co-pending U.S. pat. application Ser. No. 09/023,469 entitled "A Wireless Telecommunications System Architecture Supporting Receive Diversity," filed Feb. 13, 1998, which is incorporated by reference. Wireless telecommunications system 400 advantageously comprises a plurality of radio heads (e.g., 401-1 through 401-6) connected to baseband unit 403 via one of wirelines 402-1, 402-2, and 402-3.

Baseband unit 403 advantageously receives information-bearing traffic signals and control signaling, in well-known fashion, and modulates and channel codes the information-bearing signals for radio transmission via one or more of radio heads 401-1 through 401-6. The details of baseband unit 403 will be discussed below. Each of radio heads 401-1 through 401-6 advantageously comprises an amplifier and an antenna for radiating the respective information-bearing signals. The details of each of radio heads 401-1 through 401-6 will be discussed below.

Advantageously, the radio heads are distributed throughout the geographic area serviced by wireless telecommunications system 400 so that the coverage areas overlap and so that there are no interstices or gaps in coverage. For example, as shown in FIG. 4, the coverage area of radio head 401-1 overlaps the coverage areas of radio heads 401-2 and 401-3. It will be clear to those skilled in the art that radio heads 401-1 through 401-6 can mounted indoors, outdoors, or a combination of indoors and outdoors. Furthermore, it will be clear to those skilled in the art that a radio head can be mounted on the top of a mast with the baseband unit at the base of the mast.

In accordance with the illustrative embodiment, a radio head can be directly connected to baseband unit 403 via a proprietary wireline or, alternatively, two or more radio heads can be connected to baseband unit 403 via a shared wireline. Furthermore, in accordance with the illustrative embodiment, each wireline is fabricated from twisted-pair or any other cabling that is capable of transmitting a intermediate-frequency signal containing one or more information-bearing signals, control signals, and synchronization signals.

The illustrative embodiment is advantageously capable of communicating with a wireless terminal in either: (1) Simulcast Mode or (2) Hand-Off Mode. In Simulcast Mode, all of the radio heads in the system radiate the same information-bearing signals at the same frequencies at the same time. There are three principal advantages to Simulcast Mode. First, its simplicity engenders a low-cost installation because there is no RF engineering that has to be done other than ensuring that the respective radio heads are positioned so that there are no gaps in coverage. Second, because each radio head performs the identical function, each radio head can be configured identically, which lowers their cost of manufacture and installation. Third, in Simulcast Mode all of the traffic channels are available at each location, which enables a larger number of clustered wireless terminals to be serviced than could be serviced in Hand-Off Mode, in which only a percentage of the traffic channels are available at each location. And fourth, because there is no hand-off of wireless terminals in Simulcast Mode, baseband controller 403 can be simpler than when hand-off is supported.

There are two principal disadvantages to Simulcast Mode. First, Simulcast Mode might not efficiently re-use the available RF spectrum, which lowers the overall traffic capacity of the system, and second, all of the information-bearing signals radiated from each radio head in Simulcast Mode must precisely synchronized, in well-known fashion, which requires a mechanism for synchronizing the respective radio heads.

In Hand-Off Mode, one or more radio heads transmits one or more different information-bearing signals at different radio frequencies and the system has the capability to hand-off a wireless terminal from one radio head to another radio head, as in a conventional wireless telecommunications system. The principal advantage of Hand-Off Mode is that it allows the efficient re-use of the available RF spectrum, which raises the overall traffic capacity of the system, for a fixed number of frequencies.

There are, however, two principal disadvantages to operation in Hand-Off Mode. First, because Hand-Off Mode requires that different radio channels be assigned to different radio heads (so as to reduce co-channel and adjacent-channel interference), Hand-Off Mode requires more extensive, and thus more expensive, RF engineering when the system is installed. Second, if multiple radio heads are networked on a shared wireline, each radio head must contain circuitry to enable it to distinguish those signals from baseband unit 403 that are intended for it from signals that are intended for other radio heads.

Figure 5:
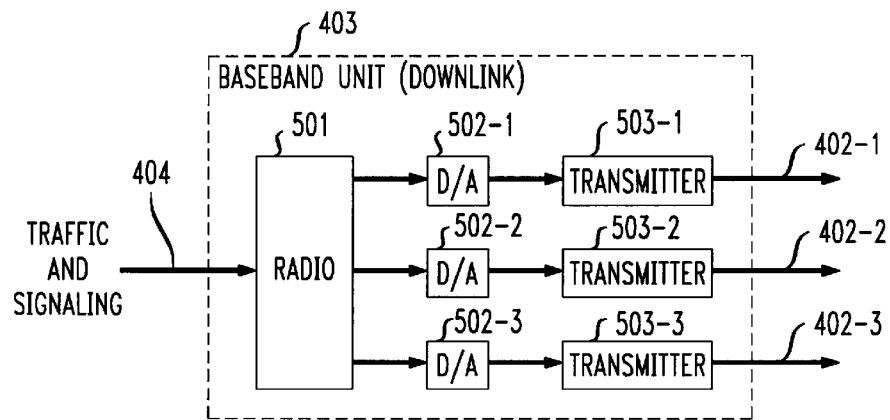
FIG. 5 depicts a block diagram of a wireless telecommunications system architecture in accordance with the illustrative embodiment of the present invention.

FIG. 5 depicts a block diagram of baseband unit 403 in accordance with the illustrative embodiment of the present invention. Baseband unit 403 advantageously comprises: radio 501, digital-to-analog converters 502-1 through 502-3, and transmitters 503-1 through 503-3, which interface with wirelines 402-1 through 402-3, respectively. In accordance with the illustrative embodiment, baseband unit 403 is capable of operation in either Simulcast Mode or Hand-Off Mode and of interfacing with each radio head via a proprietary wireline, a shared wireline, or a combination of the two.

The input to baseband unit 403 is one or more information-bearing signals (i.e., traffic channels) and associated control signaling, which can be, but are not necessarily, multiplexed onto lead 404, in well-known fashion. The source of the baseband information-bearing signals need not be a base station controller, but can be a conventional central office ("CO") switch or private branch exchange ("PBX") that is not specifically designed to handle wireless telecommunications.

Radio 501 is advantageously, but not necessarily, a block radio that comprises a digital signal processor and memory and that is capable of being re-programmed and controlled via lead 404, in well-known fashion. Block radio 501 is advantageously programmed to be capable of receiving one or more information-bearing signals and control signals from lead 404 and of multiplexing, modulating, and channel coding in accordance with an air-interface standard (e.g. GSM, IS-54 TDMA, IS-95 CDMA, etc.) and upconverting the information-bearing signals to an intermediate frequency, using well-known digital signal processing techniques.

Alternatively, radio 501 could comprise one or more traditional radios made substantially of radio frequency components, in well-known fashion. In such case, each traditional radio is capable of receiving one or more information-bearing signals and control signals from lead 404 and of multiplexing, modulating, and channel coding in accordance with an air-interface standard (e.g., GSM, IS-54 TDMA, IS-95 CDMA, etc.) and upconverting the information-bearing signals to an intermediate frequency, in well-known fashion. There are two techniques that the radio can employ to upconvert an information-bearing signal to an intermediate frequency. First, the radio can simply use the information-bearing signal to modulate an intermediate-frequency carrier. Alternatively, the radio can use the information-bearing signal to modulate a baseband carrier and then upconvert the modulated baseband carrier to an intermediate frequency using, for example, a mixer and local oscillator. It will be clear to those skilled in the art how to make and use embodiments of the present invention in which radio 501 comprises one or more traditional radios.

Radio 501 is also advantageously programmed to support either Simulcast Mode or Hand-Off Mode. For example, when the illustrative embodiment operates in Simulcast Mode, each of the information-bearing signals is upconverted to the same intermediate frequency and is transmitted over wirelines 402-1 through 402-3 for radiation by each radio head.

Alternatively, when the illustrative embodiment operates in Hand-Off Mode, each of the information-bearing signals is transmitted to only those radio heads through which the information-bearing signals are to be radiated. If two or more radio heads share a wireline, the information-bearing signals for those radio heads are frequency-division multiplexed over the shared wireline. In such case, each radio head on the shared wireline must be capable of receiving and isolating (i.e., demultiplexing) the information-bearing signals intended for it. The details of a radio head will be discussed below.

Radio 501 also advantageously generates one or more intermediate-frequency control signals that are capable of: (1) controlling which intermediate-frequency information-bearing signals each radio head selects from the wireline, and (2) controlling the radio frequency to which each information-bearing signal is upconverted by each radio head. These intermediate-frequency control signals are advantageously frequency-division multiplexed along with the intermediate-frequency information-bearing signals on each wireline.

Radio 501 also advantageously generates an intermediate-frequency synchronization signal that is transmitted to all of the radio heads so that they can synchronize their respective output signals. The synchronization signal is advantageously frequency-division multiplexed along with the intermediate-frequency information-bearing signals and the intermediate-frequency control signals on each wireline.

Radio 501 forwards the output (e.g., the information-bearing signals, control signals, and synchronization signal) for wireline 402-i, to digital-to-analog converter 502-i, which converts the digitized intermediate-frequency output to one or more analog signals. The output of digital-to-analog converter 502-i is output to transmitter 503-i, which amplifies and prepares the signals for transmission via wireline 402-i, in well-known fashion.

Figure 6:
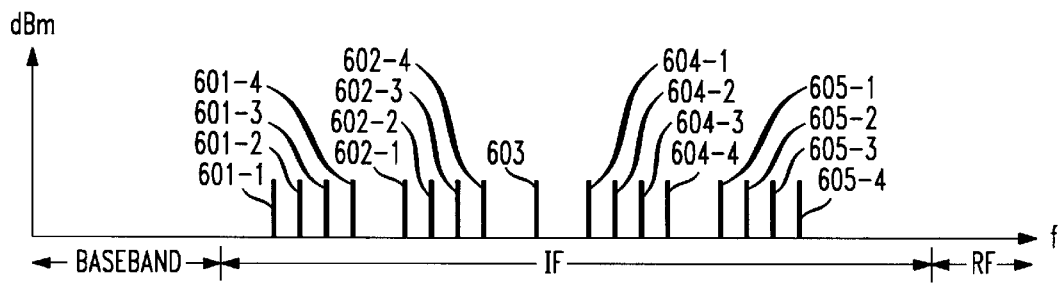
FIG. 6 depicts a graph of power as a function of frequency for a plurality of intermediate-frequency information-bearing signals, control signals, and a synchronization signal that are frequency-division multiplexed on a shared wireline.

FIG. 6 depicts a graph of power as a function of frequency for an illustrative plurality of intermediate-frequency information-bearing signals, control signals and a synchronization signal that are frequency-division multiplexed over a shared wireline to two radio heads. Information-bearing signals 601-1 through 601-4 are intended for one radio head as are control signals 601-1 through 601-4 and synchronization signal 603. Control signal 601-i is associated with information-bearing signal 601-i. Information-bearing signals 604-1 through 604-4 are intended for a second radio head as are control signals 605-1 through 605-4 and synchronization signal 603. Control signal 605-i is associated with information-bearing signal 604-i. Although each information-bearing signal is depicted as being associated with a unique control signal, it will be clear to those skilled in the art how to make and use embodiments of the present invention in which two or more information-bearing signals are associated with one control signal.

Figure 7:
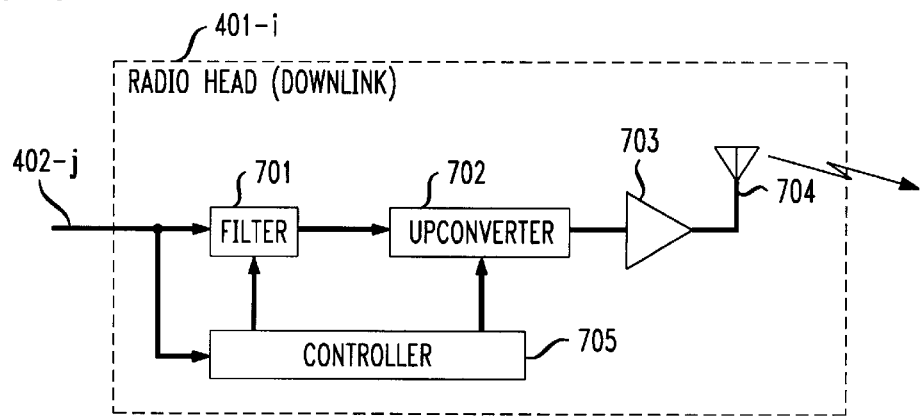
FIG. 7 depicts a block diagram of a radio head in accordance with the illustrative embodiment of the present invention.

FIG. 7 depicts a block diagram of radio head 401-i, which advantageously comprises: filter 701, upconverter 702, amplifier 703, antenna 704, and controller 705. Filter 701 is advantageously a bandpass filter that is tunable by controller 705 for isolating and capturing (i.e., frequency-division demultiplexing) only those intermediate-frequency information-bearing signals intended for radiation via antenna 704.

Upconverter 702 advantageously comprises: (1) a mixer for upconverting the intermediate-frequency information-bearing signals from filter 701 to radio frequency under the control of controller 705, and (2) a filter for filtering out the spurious frequency components created by the mixer. In an alternative embodiment, upconverter comprises a plurality of mixer/filter pairs and is capable of upconverting each intermediate-frequency information-bearing signal by a different amount, again under the control of controller 705.

Amplifier 703 amplifies the radio-frequency information-bearing signals, in well-known fashion, in preparation for radiation via antenna 704, also in well-known fashion.

Controller 705 advantageously comprises control circuitry that is capable of isolating and capturing the synchronization signal and only those intermediate-frequency control signals associated with the intermediate-frequency information-bearing signals intended for radiation via antenna 704. Based on those control signals, controller 705 is advantageously capable of: (1) controlling filter 701 to isolate and capture only those intermediate-frequency information-bearing signals intended for radiation via antenna 704, (2) controlling the radio frequency to which the information-signals are upconverted by upconverter 702, and (3) synchronizing the radio frequency to which the information-signals are upconverted by upconverter 702. It will be clear to those skilled in the art how to make and use radio head 401-i.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:
    means for upconverting a first information-bearing signal to a first intermediate frequency;
    means for transmitting said first information-bearing signal at said first intermediate frequency over a first wireline;
    a first upconverter for receiving said first information-bearing signal at said first intermediate frequency from said first wireline and for upconverting said first information-bearing signal to a first radio frequency;
    a first controller associated with said first upconverter for synchronizing said first information-bearing signal at said first radio frequency based on a synchronization signal;
    means for generating said synchronization signal; and
    means for transmitting said synchronization signal to said first upconverter over said first wireline.

2. A method comprising;
    upconverting at a baseband unit a first information-bearing signal to a first intermediate frequency;
    transmitting at said baseband unit said first information-bearing signal at said first intermediate frequency over a first wireline;
    upconverting at a first radio head said first information-bearing signal to a first radio frequency;
    generating at said baseband unit a synchronization signal;
    transmitting said synchronization signal to said first radio head over said first wireline; and
    synchronizing at said first radio head said first information-bearing signal at said first radio frequency based on said synchronization signal.

3. A wireless telecommunication system comprising:
    (1) a baseband unit comprising:
        (a) a block radio for upconverting a first information-bearing signal to a first intermediate frequency, and
        (b) a transmitter for transmitting said first information-bearing signal at said first intermediate frequency over a first wireline; and
    (2) a first radio head comprising:
        (a) a first upconverter for receiving said first information-bearing signal at said first intermediate frequency from said first wireline and for upconverting said first information-bearing signal to a first radio frequency, and
        (b) a first antenna for radiating said first information-bearing signal at said first radio frequency.

4. The wireless telecommunications system of claim 3 wherein:
    said first radio head further comprises a first controller for synchronizing said first information-bearing signal at said first radio frequency based on a synchronization signal;
    said block radio generates said synchronization signal; and
    said transmitter transmits said synchronization signal to said first controller over said first wireline.

5. The wireless telecommunications system of claim 3 wherein:
said first radio head further comprises a first controller for controlling said first radio frequency based on a first control signal;
said block radio generates said first control signal; and
said transmitter transmits said first control signal to said first controller over said first wireline.

6. The wireless telecommunications system of claim 3 wherein said block radio upconverts a second information-bearing signal to a second intermediate frequency, and said transmitter transmits said second information-bearing signal at said second first intermediate frequency over said first wireline; and further comprising:
(3) a second radio head comprising:
(a) a second upconverter for receiving said second information-bearing signal at said second intermediate frequency from said first wireline and for upconverting said second information-bearing signal to a second radio frequency, and
(b) a second antenna for radiating said second information-bearing signal at second first radio frequency.

7. An apparatus comprising:
means for upconverting a first information-bearing signal to a first intermediate frequency and a second information-bearing signal to a second intermediate frequency;
means for transmitting said first information-bearing signal at said first intermediate frequency over a first wireline and for transmitting said second information-bearing signal at said first intermediate frequency over a second wireline;
a first upconverter for receiving said first information signal at said first intermediate frequency from said first wireline and for upconverting said first information-bearing signal to a first radio frequency; and
a second upconverter for receiving said second information signal at said first intermediate frequency from said second wireline and for upconverting said second information-bearing signal to a second radio frequency.

8. The apparatus of claim 7 further comprising:
a first controller associated with said first upconverter for synchronizing said first information-bearing signal at said first radio frequency based on a synchronization signal;
a second controller associated with said second upconverter for synchronizing said second information-bearing signal at said second radio frequency based on said synchronization signal;
means for generating said synchronization signal; and
means for transmitting said synchronization signal to said first upconverter over said first wireline and to said second upconverter over said second wireline.

9. The apparatus of claim 8 wherein:
(i) said means for upconverting,
(ii) said means for transmitting said first information-bearing signal at said first intermediate frequency and for transmitting said second information-bearing signal at said first intermediate frequency,
(iii) said means for generating said synchronization signal, and
(iv) said means for transmitting said synchronization signal are associated with a baseband unit;
(i) said first upconverter, and
(ii) said first controller are associated with a first radio head; and
(i) said second upconverter, and
(ii) said second controller are associated with a second radio head.

10. The apparatus of claim 8 wherein said synchronization signal is an intermediate-frequency signal.

11. The apparatus of claim 8 wherein said means for upconverting is a block radio.

12. The apparatus of claim 7 further comprising:
a first controller associated with said first upconverter for controlling said first radio frequency based on a first control signal;
a second controller associated with said second upconverter for controlling said second radio frequency based on a second control signal;
means for generating said first control signal at a third intermediate frequency and said second control signal at a fourth intermediate frequency; and
means for transmitting said first control signal at said third intermediate frequency to said first controller over said first wireline and said second control signal at said fourth intermediate frequency to said second controller over said second wireline.

13. The apparatus of claim 12 wherein
(i) said means for upconverting,
(ii) said means for transmitting said first information-bearing signal at said first intermediate frequency and for transmitting said second information-bearing signal at said first intermediate frequency,
(iii) said means for generating said first control signal and said second control signal, and
(iv) said means for transmitting said first control signal and said second control signal are associated with a baseband unit,
(i) said first upconverter, and
(ii) said first controller are associated with a first radio head; and
(i) said second upconverter, and
(ii) said second controller are associated with a second radio head.

14. The apparatus of claim 12 wherein said first control signal and said second control signal are intermediate-frequency signals.

15. The apparatus of claim 12 wherein said means for upconverting is a block radio.

16. The apparatus of claim 12 wherein said means for generating said first control signal and said second control signal is a block radio.

17. The apparatus of claim 7 wherein said first intermediate frequency and said second intermediate frequency are the same.

18. The apparatus of claim 7 wherein said first radio frequency and said second radio frequency are the same.

19. The apparatus of claim 7 wherein said first wireline and said second wireline are the same.

20. The apparatus of claim 9 wherein said first information-bearing signal and said second information-bearing signal are frequency-division multiplexed over said first wireline.

21. A method comprising:
upconverting at a baseband unit a first information-bearing signal to a first intermediate frequency and a second information-bearing signal to a second intermediate frequency;

transmitting at said baseband unit said first information-bearing signal at said first intermediate frequency over a first wireline;

transmitting at said baseband unit said second information-bearing signal at said second intermediate frequency over a second wireline;

upconverting at a first radio head said first information-bearing signal to a first radio frequency; and upconverting at a second radio head said second information-bearing signal to a second radio frequency.

22. The method of claim 21 comprising:

generating at said baseband unit a synchronization signal;

transmitting said synchronization signal to said first radio head over said first wireline;

transmitting said synchronization signal to said second radio head over said second wireline;

synchronizing at said first radio head said first information-bearing signal at said first radio frequency based on said synchronization signal; and synchronizing at said second radio head said second information-bearing signal at said second radio frequency based on said synchronization signal.

23. The method of claim 21 comprising:

generating at said baseband unit a first control signal at a third intermediate frequency and a second control signal at a fourth intermediate frequency;

transmitting said first control signal to said first radio head over said first wireline;

transmitting said second control signal to said second radio head over said second wireline;

controlling at said first radio head said first radio frequency based on said first control signal; and controlling at said second radio head said second radio frequency based on said second control signal.

24. The method of claim 21 wherein said first intermediate frequency and said second intermediate frequency are the same.

25. The method of claim 21 wherein said first radio frequency and said second radio frequency are the same.

26. The method of claim 21 wherein said first wireline and said second wireline are the same.

27. A wireless telecommunications system comprising:

(1) a baseband unit comprising:
   (a) a block radio for upconverting a first information-bearing signal to a first intermediate frequency and a second information-bearing signal to a second intermediate frequency, and
   (b) a transmitter for transmitting said first information-bearing signal at said first intermediate frequency over a first wireline and for transmitting said second information-bearing signal at said first intermediate frequency over a second wireline;

(2) a first radio head comprising:
   (a) a first upconverter for receiving said first information signal at said first intermediate frequency from said first wireline and for upconverting said first information-bearing signal to a first radio frequency, and
   (b) a first antenna for radiating said first information-bearing signal at said first radio frequency; and (3) a second radio head comprising:
   (a) a second upconverter for receiving said second information signal at said first intermediate frequency from said second wireline and for upconverting said second information-bearing signal to a second radio frequency, and
   (b) a second antenna for radiating said second information-bearing signal at said second radio frequency.

28. The wireless telecommunications system of claim 27 wherein:

said first radio head further comprises a first controller for synchronizing said first information-bearing signal at said first radio frequency based on a synchronization signal;

said second radio head further comprises a second controller for synchronizing said second information-bearing signal at said second radio frequency based on said synchronization signal;

said block radio generates said synchronization signal; and said transmitter transmits said synchronization signal to said first controller over said first wireline, and to said second controller over said second wireline.

29. The wireless telecommunications system of claim 27 wherein:

said first radio head further comprises a first controller for controlling said first radio frequency based on a first control signal;

said second radio head further comprises a second controller for controlling said second radio frequency based on a second control signal;

said block radio generates said first control signal and said second control signal; and said transmitter transmits said first control signal to said first controller over said first wireline, and said second control signal to said second controller over said second wireline.

30. The wireless telecommunications system of claim 27 wherein said first wireline and said second wireline are the same.

31. The wireless telecommunications system of claim 27 wherein said first intermediate frequency and said second intermediate frequency are the same.

32. The wireless telecommunications system of claim 27 wherein said first radio frequency and said second radio frequency are the same.

* * * * *